(12) United States Patent
Chaudhari et al.

(10) Patent No.: US 11,549,463 B2
(45) Date of Patent: Jan. 10, 2023

(54) COMPACT LOW-PRESSURE COMPRESSOR

(71) Applicant: General Electric Company, Schenectady, NY (US)

(72) Inventors: Vinod Shashikant Chaudhari, Bengaluru (IN); Bhaskar Nanda Mondal, Bengaluru (IN); Tsuguji Nakano, Evendale, OH (US); David W. Crall, Evendale, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/181,773

(22) Filed: Feb. 22, 2021

(65) Prior Publication Data

US 2022/0268209 A1  Aug. 25, 2022

(51) Int. Cl.
| | |
|---|---|
| *F02K 3/072* | (2006.01) |
| *F02C 3/04* | (2006.01) |
| *F02C 3/08* | (2006.01) |
| *F02K 3/04* | (2006.01) |
| *F02C 7/36* | (2006.01) |

(Continued)

(52) U.S. Cl.
CPC .............. *F02K 3/072* (2013.01); *F01D 5/022* (2013.01); *F02C 3/04* (2013.01); *F02C 3/08* (2013.01); *F02C 7/36* (2013.01); *F02K 3/04* (2013.01); *F02C 6/206* (2013.01)

(58) Field of Classification Search
CPC ....... F02K 3/04–072; F02K 3/072–077; F02C 3/08–09; F02C 3/067; F02C 3/103; F02C 6/206; F05D 2250/044; F05D 2210/42; F04D 17/025; F04D 1/025; F04D 29/544; F04D 29/384; B64D 2027/005;
(Continued)

(56) References Cited

U.S. PATENT DOCUMENTS

| | | |
|---|---|---|
| 3,188,804 A | 6/1965 | Melenric |
| 3,524,318 A | 8/1970 | Bauger et al. |

(Continued)

FOREIGN PATENT DOCUMENTS

| | | | | |
|---|---|---|---|---|
| WO | WO-2004092567 A2 | * | 10/2004 | ......... B64C 29/0075 |
| WO | WO-2006001927 A2 | * | 1/2006 | ............ B64C 27/20 |

OTHER PUBLICATIONS

Joachim Kurzke and Ian Halliell, Propulsion and Power: An Exploration of Gas Turbine Performance Modeling, May 28, 2018, Springer publishing, ISBN 978-3-319-75977-7, pp. 73, 417 (Year: 2018).*

*Primary Examiner* — Stephanie Sebasco Cheng
(74) *Attorney, Agent, or Firm* — Hanley, Flight & Zimmerman, LLC

(57) ABSTRACT

Methods, apparatus, systems and articles of manufacture for compact compressors are disclosed including a gas turbine engine defining an axial direction and a radial direction, the gas turbine engine including an axial flow compressor and a radial flow compressor, wherein the axial flow compressor is located axially forward of the radial flow compressor, a blade assembly including a splitter shroud to divide incoming air into axial air flow for the axial flow compressor and radial air flow for the radial flow compressor, the blade assembly rotating relative to the axial flow compressor and counter-rotating relative to the radial flow compressor, and wherein the blade assembly is located axially aft of the radial flow compressor.

20 Claims, 7 Drawing Sheets

(51) Int. Cl.
  *F01D 5/02* (2006.01)
  *F02C 6/20* (2006.01)

(58) Field of Classification Search
  CPC ...... F01D 5/14–142; F01D 1/24; F01D 5/022;
  F01D 5/03; F01D 5/146
  See application file for complete search history.

(56) References Cited

U.S. PATENT DOCUMENTS

| | | | |
|---|---|---|---|
| 3,673,802 A | 7/1972 | Krebs et al. | |
| 3,811,791 A * | 5/1974 | Cotton | B64C 23/005 |
| | | | 416/129 |
| 4,767,271 A * | 8/1988 | Catlow | F01D 5/3053 |
| | | | 416/129 |
| 5,274,999 A | 1/1994 | Rohra et al. | |
| 7,607,286 B2 * | 10/2009 | Suciu | F02C 3/073 |
| | | | 60/39.43 |
| 7,849,669 B2 * | 12/2010 | Keogh | F02K 3/072 |
| | | | 60/39.181 |
| 7,886,544 B2 | 2/2011 | Koenig | |
| 8,104,257 B2 * | 1/2012 | Norris | F02K 3/068 |
| | | | 60/268 |
| 9,909,494 B2 * | 3/2018 | Roberge | F02C 3/073 |
| 10,859,096 B2 * | 12/2020 | Drolet | F04D 29/666 |
| 2005/0138914 A1 * | 6/2005 | Paul | F02K 9/78 |
| | | | 60/226.1 |
| 2006/0086078 A1 * | 4/2006 | Paul | F02C 3/14 |
| | | | 60/226.1 |
| 2012/0023899 A1 * | 2/2012 | Yasuda | F02K 3/06 |
| | | | 60/224 |
| 2016/0333886 A1 | 11/2016 | Andersen | |
| 2017/0002659 A1 * | 1/2017 | Epstein | F02K 3/025 |
| 2018/0355791 A1 * | 12/2018 | Nolcheff | F02C 3/08 |
| 2019/0024610 A1 | 1/2019 | Houston et al. | |

* cited by examiner

COMPACT LOW-PRESSURE COMPRESSOR

FIELD OF THE DISCLOSURE

This disclosure relates generally to gas turbines, and, more particularly, to compact compressors.

BACKGROUND

Gas turbines, also known as combustion turbines and turbine engines, are used in a variety of applications such as industrial power production and aircraft propulsion systems. These gas turbines include one or more compressor stages, a combustor, and one or more turbine stages. Aircrafts include gas turbines (e.g., combustion turbines, turbine engines, etc.) in their propulsion systems to generate thrust.

BRIEF SUMMARY

Methods, systems, and articles of manufacture corresponding to compact compressors are disclosed herein.

Certain examples provide a gas turbine engine defining an axial direction and a radial direction, the gas turbine engine including an axial flow compressor. The example gas turbine engine also includes a radial flow compressor, wherein the axial flow compressor is located axially forward of the radial flow compressor. The example gas turbine engine also includes a blade assembly including a splitter shroud to divide incoming air into axial air flow for the axial flow compressor and radial air flow for the radial flow compressor, the blade assembly rotating relative to the axial flow compressor and counter-rotating relative to the radial flow compressor, and wherein the blade assembly is located axially aft of the radial flow compressor.

Certain examples provide a turbofan engine defining an axial direction, the turbofan engine comprising an axial compressor stage including a casing and a plurality of airfoils. The example turbofan engine also includes centrifugal compressor stage including an impeller and a plurality of diffuser passages, the centrifugal compressor stage to the axial aft of the axial compressor stage. The example turbofan engine also includes a fan disposed to the axial aft of the centrifugal compressor stage.

Certain examples provide a compressor assembly for an aircraft engine, the aircraft engine defining an axial direction and a radial direction, including an axial flow compressor stage. The example compressor assembly also includes a radial flow compressor stage to the axial aft of the axial flow compressor stage. The example compressor assembly also includes a blade assembly including inner airfoils and outer airfoils separated by a splitter shroud to divide incoming air into axial air flow for the axial flow compressor and radial air flow for the radial flow compressor and disposed to the axial aft of the radial flow compressor stage, wherein the axial flow compressor stage, the radial flow compressor stage, and the inner airfoils define a flow passage.

Figure 1:
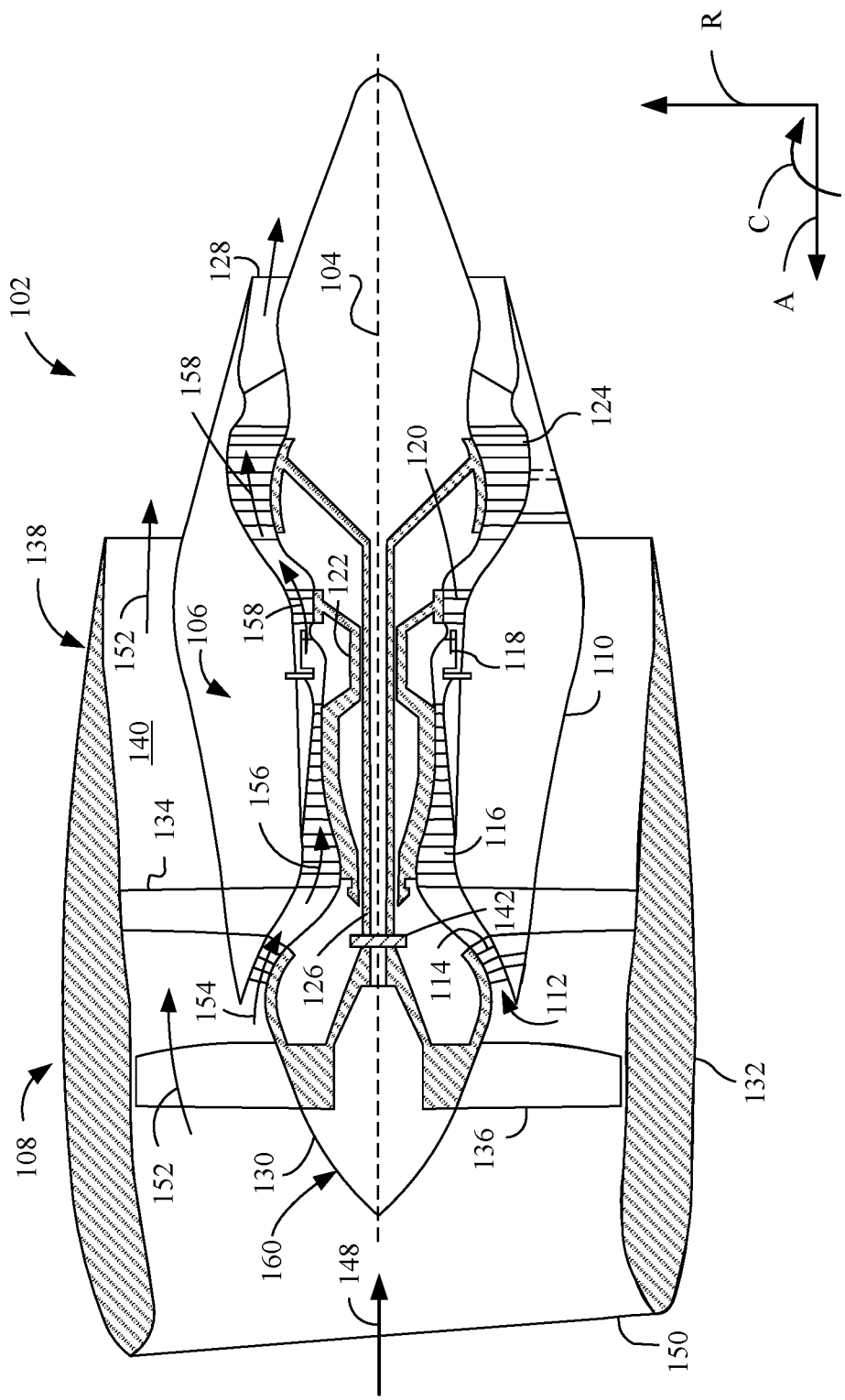
FIG. 1 is an example traditional turbofan engine for propulsion of an aircraft.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Aircrafts include engines that act as a propulsion system to generate mechanical power and forces such as thrust. A gas turbine, also called a combustion turbine or a turbine engine, is a type of internal combustion engine that can be implemented in the propulsion system of an aircraft. For example, a gas turbine can be implemented in connection with a turbofan or a turbojet aircraft engine. Gas turbines also have significant applications in areas such as industrial power generation.

As used herein, the terms "axial" and "longitudinal" both refer to a direction parallel to the centerline axis of an gas turbine (e.g., a turbofan, a core gas turbine engine, etc.), while "radial" refers to a direction perpendicular to the axial direction, and "tangential" or "circumferential" refers to a direction mutually perpendicular to the axial and radial directions. Accordingly, as used herein, "radially inward" refers to the radial direction from the outer circumference of the gas turbine towards the centerline axis of the gas turbine, and "radially outward" refers to the radial direction from the centerline axis of the gas turbine towards the outer circumference of gas turbine. As used herein, the terms "forward", "fore", and "front" refer to a location relatively upstream in an air flow passing through or around a component, and the terms "aft" and "rear" refer to a location relatively downstream in an air flow passing through or around a component.

The basic operation of a gas turbine implemented in connection with a turbofan engine of a propulsion system of an aircraft includes an intake of fresh atmospheric air flow through the front of the turbofan engine. In the operation of a turbofan engine, a first portion of the intake air bypasses a core gas turbine engine of the turbofan to produce thrust directly. A second portion of the intake air travels through a traditional booster compressor (e.g., a first compressor) located between a fan and a high-pressure compressor (e.g., a second compressor) in the core gas turbine engine (e.g., the gas turbine). The booster compressor is used to raise or boost the pressure of the second portion of the intake air prior to the air flow entering the high-pressure compressor. The air flow can then travel through the high-pressure compressor that further pressurizes the air flow. The booster compressor and the high-pressure compressor each include a group of blades attached to a rotor and/or shaft. The blades spin at high speed (e.g., absolute speed, relative to stationary vanes, etc.) and each subsequently compresses the air flow. The high-pressure compressor then feeds the pressurized air flow to a combustion chamber (e.g., combustor). In some examples, the high-pressure compressor feeds the pressurized air flow at speeds of hundreds of miles per hour. In some instances, the combustion chamber includes one or more rings of fuel injectors that inject a steady stream of fuel into the combustion chamber, where the fuel mixes with the pressurized air flow. A secondary use of the compressors, particularly the high-pressure compressor, is to bleed air for use in other systems of the aircraft (e.g., cabin pressure, heating, and air conditioning, etc.)

In the combustion chamber of the core gas turbine engine, the fuel is ignited with an electric spark provided by an igniter, where the fuel in some examples burns at temperatures of more than 2,000 degrees Fahrenheit. The resulting combustion produces a high-temperature, high-pressure gas stream (e.g., hot combustion gas) that passes through another group of blades called a turbine. The turbine can include a low-pressure turbine and a high-pressure turbine, for example. Each of the low-pressure turbine and the high-pressure turbine includes an intricate array of alternating rotating blades and stationary airfoil-section blades (e.g., vanes). The high-pressure turbine is located axially downstream from the combustor and axially upstream from the low-pressure turbine. As the hot combustion gas passes through the turbine, the hot combustion gas expands through the blades and/or vanes, causing the rotating blades couples to rotors of the high-pressure turbine and the low-pressure turbine to spin.

The rotating blades of the high-pressure turbine and the low-pressure turbine serve at least two purposes. A first purpose of the rotating blades is to drive the fan, the high-pressure compressor, and/or the booster compressor to draw more pressured air into the combustion chamber. For example, in a dual-spool design of a turbofan, the low-pressure turbine (e.g., a first turbine) can be attached to and in force-transmitting connection with the booster compressor (e.g., the first compressor) and fan via a first shaft, collectively a first spool of the gas turbine, such that the rotation of a rotor of the low-pressure turbine drives a rotor of the booster compressor and the fan. For example, a high-pressure turbine (e.g., a second turbine) can be attached to and in force transmitting connection with the high-pressure compressor (e.g., a second compressor) via a second shaft coaxial with the first shaft, collectively a second spool of the gas turbine, such that the rotation of a rotor of the high-pressure turbine drives a rotor of the high-pressure compressor. A second purpose of the rotating blades is to spin a generator operatively coupled to the turbine section to produce electricity. For example, the turbine can generate electricity to be used by an aircraft, a power station, etc.

It is generally an object of the design of aircraft engines such as turbofans to compress as much air as is feasible within the compressor of the a core gas turbine engine given the static, dynamic, centrifugal and/or thermal stress limitations and weight considerations of aspects of the core gas turbine engine and/or the turbofan engine. A metric defining the compressive action of a compressor is a compression ratio (e.g., pressure ratio) of a compressor. The compression ratio of a compressor of a turbofan engine is the ratio of pressure at an outlet of the compressor (e.g., the outlet of the high-pressure compressor at the combustion chamber of the gas turbine) to pressure at an inlet of a fan. A higher compression ratio increases a thermal efficiency of the turbine engine and decreases a specific fuel consumption of the turbine engine (e.g., a ratio of fuel used to thrust produced by the jet engine). Thus, an increase in the compression ratio of the compressor of a gas turbine can increase thrust produced by a jet engine, such as a turbofan, etc., and/or can increase fuel efficiency of the jet engine. In turn, it is an object of gas turbine design to improve the compression ratio. Though examples disclosed herein are discussed in connection with a turbofan jet engine, it is understood that examples disclosed herein can be implemented in connection with a turbojet jet engine, a turboprop jet engine, a combustion and/or gas turbine for power production, or any other suitable application where it is desired to increase compression ratios across one or more compressors.

In some examples disclosed herein, the booster and/or low-pressure compressor includes an axial-flow compressor including one or more stages, each stage including a ring of rotating airfoils. The airfoils of the stage increase the kinetic energy of inlet air and compress the air. In some of these examples, axial flow compressors include only rotating airfoils (e.g., blades) and do not include a stator portion. In some examples disclosed herein, the booster compressor also includes a centrifugal compressor. Centrifugal compressors, different from axial compressors, include a rotating centrifugal impeller including annularly arranged blades. The impeller includes a rotor and/or central portion that is radially larger moving to the aft (e.g., moving away from the inlet) of the turbine engine. Centrifugal compressors draw in inlet air incident on the impeller, which increases the kinetic energy of the air and compresses the air as the air moves radially outward through the impeller. The impeller is surrounded by one or more diffusors to further compress the air. Mixed flow compressors combine aspects of axial compressors and centrifugal compressors to expel compressed air at an angle between radial and axial (e.g., diagonal). Additionally or alternatively, example turbofan engines disclosed herein include one or more mixed flow compressors. More generally, as used herein, a radial-flow compressor includes both of (a) a centrifugal compressor and (b) a mixed flow compressor and directs compressed air in an at least partially radial direction.

An example compact compressor (e.g., an example compact compressor for a turbofan engine) disclosed herein includes an axial flow compressor and a radial flow compressor, collectively a compact compressor, positioned in place of a traditional nose cone (e.g., spinner cone) of a turbofan engine. The example compact compressor does not include stator components. In contrast to traditional turbofan engines, the compact compressor is located to the fore of the turbine engine in front of the fan, implemented as part of an example blade assembly. The compact compressor includes an axial compressor in series with a radial flow compressor. In some examples, the radial flow compressor can be a mixed flow compressor discharging compressed air radially outwards and to the axial aft of the turbine engine. In some examples, the radial flow compressor can be a centrifugal compressor, and can, in turn, expel air largely in the radial direction. In some examples, only a radial flow compressor is positioned in place of a traditional nose cone (e.g., spinner cone) of a turbofan engine. In such examples, the radial flow compressor, implemented in front of the fan as part of an example blade assembly, discharges compressed air through the turbine engine without the aid of the axial compressor.

Advantageously, examples disclosed herein can increase compression ratios of the turbine engine and decrease the length of a turbofan engine, decreasing the material used for construction of the turbofan engine, by positioning the booster compressor (e.g., the compact compressor) in place of the nose cone. In an example blade assembly, to the aft of the compact compressor, outer airfoils are separated by an annular splitter shroud (e.g., a flow splitter) from inner airfoils. The outer airfoils (e.g., the fan) lead to a bypass duct to the aft of the blade assembly. The inner airfoils receive compressed air from the compact compressor and lead to an example high pressure compressor. The blade assembly can be mounted via axial slots (e.g., dovetail slots, fir tree slots, etc.) on the rotor. The rotor is coupled to a spool (e.g., a shaft) and a turbine (e.g., a low pressure turbine) via a gear box, such that the rotor and the blade assembly are counter rotating relative to the spool and the radial flow compressor. In other examples, the blade assembly and rotor can be implemented as a blisk (a bladed disk).

In some examples, blades of the axial compressor implemented in connection with compact compressors disclosed herein include a wide chord length relative to the chord length of blades of a traditional booster compressor. In some examples, the implementation of the blade assembly and the compact compressor reduces the length of the turbine engine and the weight of the turbine engine. In some examples, due to the high speeds of the blades of the axial compressor and the impeller of the compact compressor and due to the counterrotation between the radial flow compressor and the blade assembly, the compact compressor and/or the blade assembly have a higher pressure ratio than traditional booster compressors and requires less stages than traditional booster compressors. Due to the geometry of the compact compressor, Inlet Guide Vanes (IGVs) and Variable Stator Vanes (VSVs) are not required, decreasing the complexity of a turbine engine including the compact compressor. In some examples, the lack of stator portions of the compact compressor reduces ice formation on components associated with the compact compressor compared to components associated with traditional booster compressors. In some examples, arrangement of the compact compressor at the fore of the turbine engine simplifies assembly of a turbine engine including the compact compressor and allows maintenance of the compact compressor without disassembly of the turbine engine. In some examples, engines including the compact compressor burn less fuel than turbine engines including traditional booster compressors.

FIG. 1 is a schematic illustration of an example traditional turbofan gas turbine engine 102. The example traditional turbofan engine 102 includes an example core gas turbine engine 106, an example fan section 108, an example outer casing 110, an example annular inlet 112, an example traditional booster compressor 114, an example high-pressure compressor 116 (e.g., a high-pressure, multi-stage, axial-flow compressor), an example combustor 118, a first example turbine 120, a first example drive shaft 122, a second example turbine 124, a second example drive shaft 126, an example exhaust nozzle 128, an example axial-flow fan rotor assembly 130, an example annular fan casing 132, example guide vanes 134, example fan rotor blades 136, an example downstream section 138, an example airflow conduit 140, an example speed reduction device 142, an example inlet 150, and example combustion products 158.

The traditional turbofan engine 102 is shown having a longitudinal or axial centerline axis 104 extending throughout the traditional turbofan engine 102 for reference purposes. The direction of this flow is shown by an arrow 148 in FIG. 1. These directional terms are used merely for convenience in description and do not require a particular orientation of the structures described thereby. FIG. 1 also includes an annotated directional diagram with reference to an axial direction A, a radial direction R, and a circumferential direction C. In general, as used herein, the axial direction A is a direction that extends generally parallel to the centerline axis 104, the radial direction R is a direction that extends orthogonally outwardly from the centerline axis 104, and the circumferential direction C is a direction that extends concentrically around the centerline axis 104.

The traditional turbofan engine 102 of FIG. 1 includes the core gas turbine engine 106 and the fan section 108 positioned upstream thereof. The core gas turbine engine 106 can generally include the substantially tubular outer casing 110 that defines an annular inlet 112. In addition, the outer casing 110 can further enclose and support the traditional booster compressor 114 for increasing the pressure of the air that enters the core gas turbine engine 106 to a first pressure level. The high-pressure compressor 116 can then receive the pressurized air from the traditional booster compressor 114 and further increase the pressure of such air to a second pressure level.

In the illustrated example of FIG. 1, the pressurized air exiting the high-pressure compressor 116 can then flow to the combustor 118 within which fuel is injected into the flow of pressurized air, with the resulting mixture being combusted within the combustor 118. The high-energy combustion products are directed from the combustor 118 along the hot gas path of the traditional turbofan engine 102 to the first (high-pressure) turbine 120 for driving the high-pressure compressor 116 via the first (high-pressure) drive shaft 122, and then to the second (low-pressure) turbine 124 for driving the traditional booster compressor 114 and fan section 108 via the second (low-pressure) drive shaft 126 that is generally coaxial with first drive shaft 122. After driving each of the turbines 120 and 124, the combustion products can be expelled from the core gas turbine engine 106 via the exhaust nozzle 128 to provide propulsive jet thrust.

In some examples, each of the traditional booster compressor 114 and high pressure compressor 116 can include a plurality of compressor stages, with each stage including both an annular array of stationary compressor vanes and an annular array of rotating compressor blades positioned immediately downstream of the compressor vanes. Similarly, each of the turbines 120, 124 can include a plurality of turbine stages, each stage including both an annular array of stationary nozzle vanes and an annular array of rotating turbine blades positioned immediately downstream of the nozzle vanes.

Additionally, as shown in FIG. 1, the fan section 108 of the traditional turbofan engine 102 can generally include the rotatable, axial-flow fan rotor assembly 130 that is configured to be surrounded by the annular fan casing 132. The fan casing 132 can be configured to be supported relative to the core gas turbine engine 106 by the plurality of substantially radially-extending, circumferentially-spaced outlet guide vanes 134. As such, the fan casing 132 can enclose the fan rotor assembly 130 and its corresponding fan rotor blades 136. Moreover, the downstream section 138 of the fan casing 132 can extend over an outer portion of the core gas turbine engine 106 to define the secondary, or by-pass, airflow conduit 140 that provides additional propulsive jet thrust.

In some examples, the second (low-pressure) drive shaft 126 is directly coupled to the fan rotor assembly 130 to provide a direct-drive configuration. Alternatively, the second drive shaft 126 can be coupled to the fan rotor assembly 130 via the speed reduction device 142 (e.g., a reduction gear or gearbox) to provide an indirect-drive or geared drive configuration. Such a speed reduction device(s) can also be provided between any other suitable shafts and/or spools within the traditional turbofan engine 102 as desired or required.

During operation of the traditional turbofan engine 102, an initial air flow (indicated by arrow 148) can enter the engine 102 through the associated inlet 150 of the fan casing 132. The air flow 148 then passes through the fan blades 136 and splits into a first compressed air flow (indicated by arrow 152) that moves through conduit 140 and a second compressed air flow (indicated by arrow 154) which enters the traditional booster compressor 114. The pressure of the second compressed air flow 154 is then increased and enters the high-pressure compressor 116 (as indicated by arrow 156). After mixing with fuel and being combusted within the combustor 118, the combustion products 158 exit the combustor 118 and flow through the first turbine 120. Thereafter, the combustion products 158 flow through the second turbine 124 and exit the exhaust nozzle 128 to provide thrust for the traditional turbofan engine 102.

In the illustrated example of FIG. 1, the traditional turbofan engine 102 includes a spinner cone 160 (e.g., a nose cone, etc.) at the fore of the axial-flow fan rotor assembly 130. The spinner cone 160 acts to direct air incident on the axial-flow fan rotor assembly 130 towards the first and/or second compressed air flows (e.g., air intakes) of the traditional turbofan engine 102 indicated by the arrows 152, 154 and increase the aerodynamics of the traditional turbofan engine 102. However, the spinner cone 160 includes a large portion of the traditional turbofan engine 102 (e.g., a large portion of the axial and radial lengths of the traditional turbofan 102, a large volumetric portion of the traditional turbofan 102, etc.).

Figure 2:
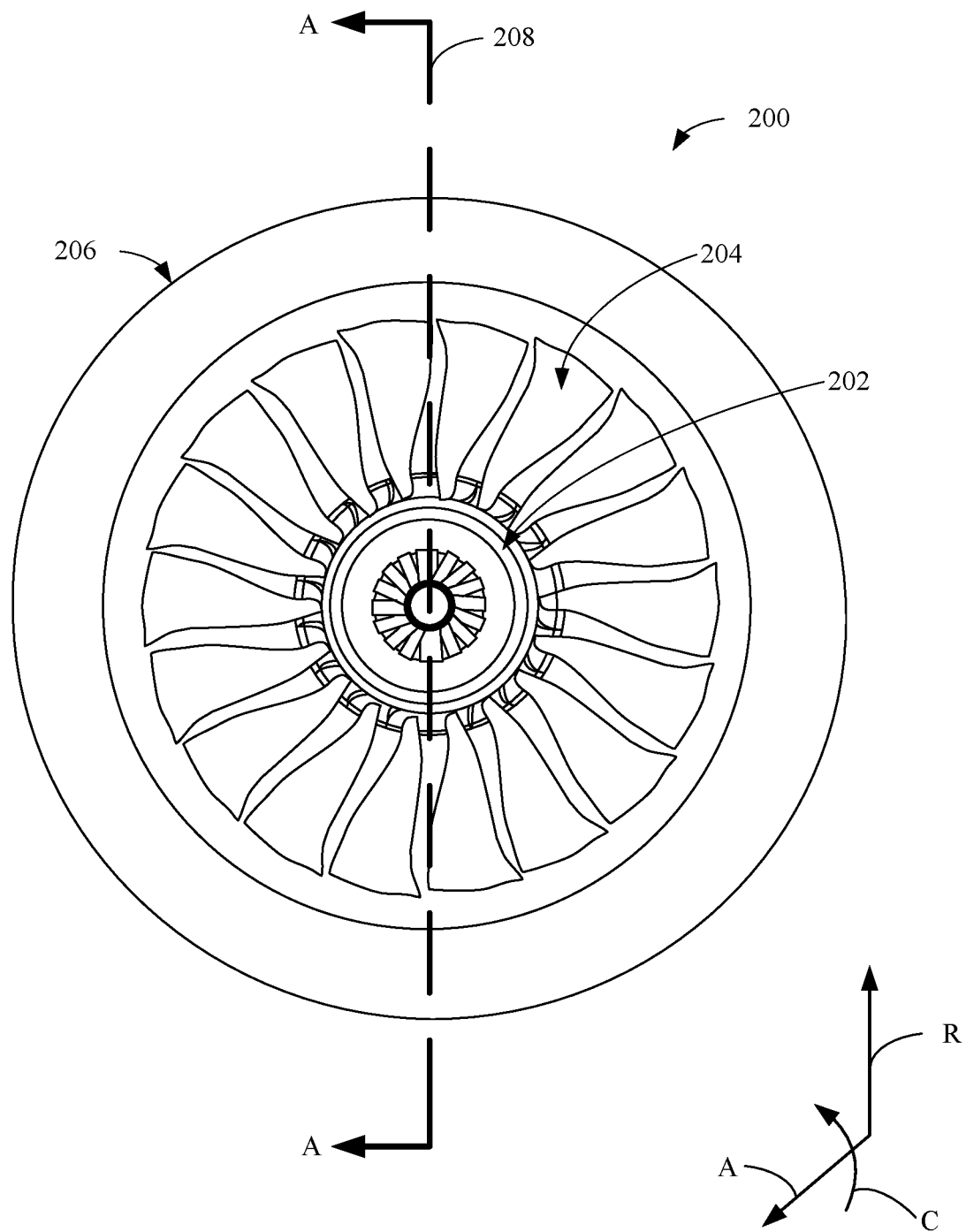
FIG. 2 is a front view of a turbofan engine including example compact compressor and an example blade assembly that can be implemented in connection with the teachings of this disclosure including an A-A cutting line.

FIG. 2 is a front view of an example turbofan engine 200 (e.g., a turbofan, a gas turbine engine, etc.) that can be implemented in connection with the teachings of this disclosure. In contrast to the traditional turbofan engine 102 of FIG. 1, the turbofan engine 200 includes an example compact compressor 202 and an example blade assembly 204. In the illustrated example of FIG. 2, the blade assembly 204 includes a splitter shroud and is positioned to the axial aft of the compact compressor 202. During operation of the turbofan engine 200, a first portion of inlet air flow (e.g., a first portion analogous to the arrow 152 of FIG. 1) enters the turbofan engine 200 at the fore of the blade assembly 204. Similarly, a second portion of inlet air flow (e.g., a second portion analogous to the arrow 154 of FIG. 1, the working fluid for a core gas turbine engine including the compact compressor 202, etc.) enters the turbofan engine 200 at the fore of the compact compressor 202. In the illustrated example of FIG. 2, the turbofan engine 200 includes an example fan casing 206 surrounding the compact compressor 202 and the blade assembly 204. An A-A cutting line 208 is shown in FIG. 2. For example, aspects of the turbofan engine 200 such as the compact compressor 202 and the blade assembly 204 can be manufactured using subtractive manufacturing techniques such as Computer Numerical Control (CNC) milling, Electrochemical Machining (ECM), etc., and can be formed from a material such as titanium alloys (e.g., a titanium-aluminum alloy and/or a titanium-chromium alloy, etc.), steel alloys (e.g., a steel-chromium alloy, etc.), nickel alloys (e.g., a nickel-copper alloy, a nickel-iron alloy, a nickel-chromium alloy, a nickel-niobium alloy, and/or a nickel-carbon alloy, etc.), and/or Ceramic Matrix Composites (CMCs), etc. Additionally or alternatively, the aspects of the turbofan engine 200 can be manufactured using additive manufacturing techniques and/or formed with other materials.

Figure 3:
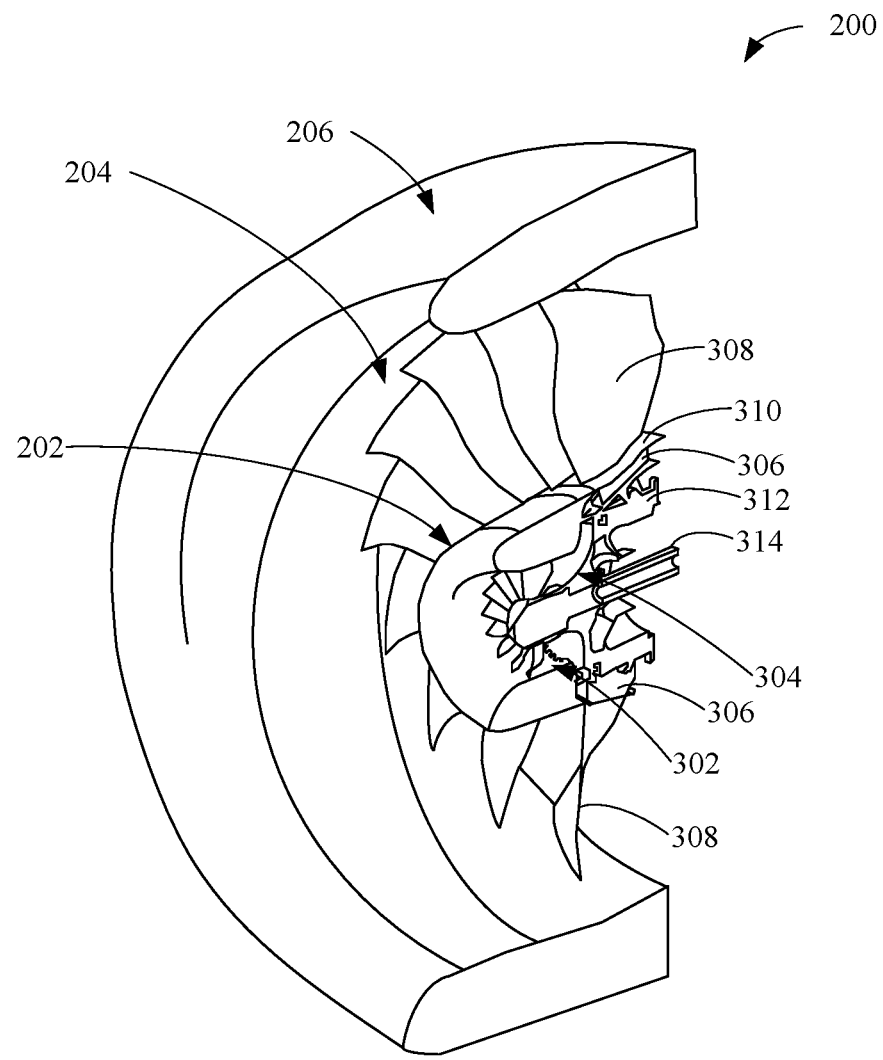
FIG. 3 is a front-right-top perspective view of the example turbofan engine including the compact compressor of FIG. 2 cut along the A-A cutting line of FIG. 2.

FIG. 3 is a front-right-top perspective view of the example turbofan engine 200 including the compact compressor 202 of FIG. 2 cut along the A-A cutting line 208 of FIG. 2. In the illustrated example of FIG. 3, the compact compressor 202 (FIG. 2) includes an example axial compressor 302 (e.g., an example axial compressor stage, an example vaneless compressor, etc.) and an example radial flow compressor 304 (e.g., a centrifugal compressor stage, a mixed flow compressor stage etc.) to the axial aft of the axial compressor 302. For example, the axial compressor 302 is axially forward from the radial flow compressor 304 relative to the turbofan engine 200. The blade assembly 204 (FIG. 2) includes example inner airfoils 306 separated from example outer airfoils 308 by an example splitter shroud 310. In some examples, the outer airfoils 308 of the blade assembly 204 define a fan disposed in a bypass flow passage (e.g., a bypass flow passage defined between the splitter shroud 310 and the fan casing 206 (FIG. 2)) of the gas turbine engine (e.g., the turbofan engine 200), and wherein inner airfoils 306 of the blade assembly 204 are disposed within a primary flow passage of the gas turbine engine common to the inner airfoils 306, the axial flow compressor 302, and the radial flow compressor 304. Though only a portion of the inner and outer airfoils 306, 308 are visible and/or labeled in the view of FIG. 3, the blade assembly 204 includes other airfoils 306, 308 arranged annularly about and mounted on an example first rotor 312.

Figure 10:
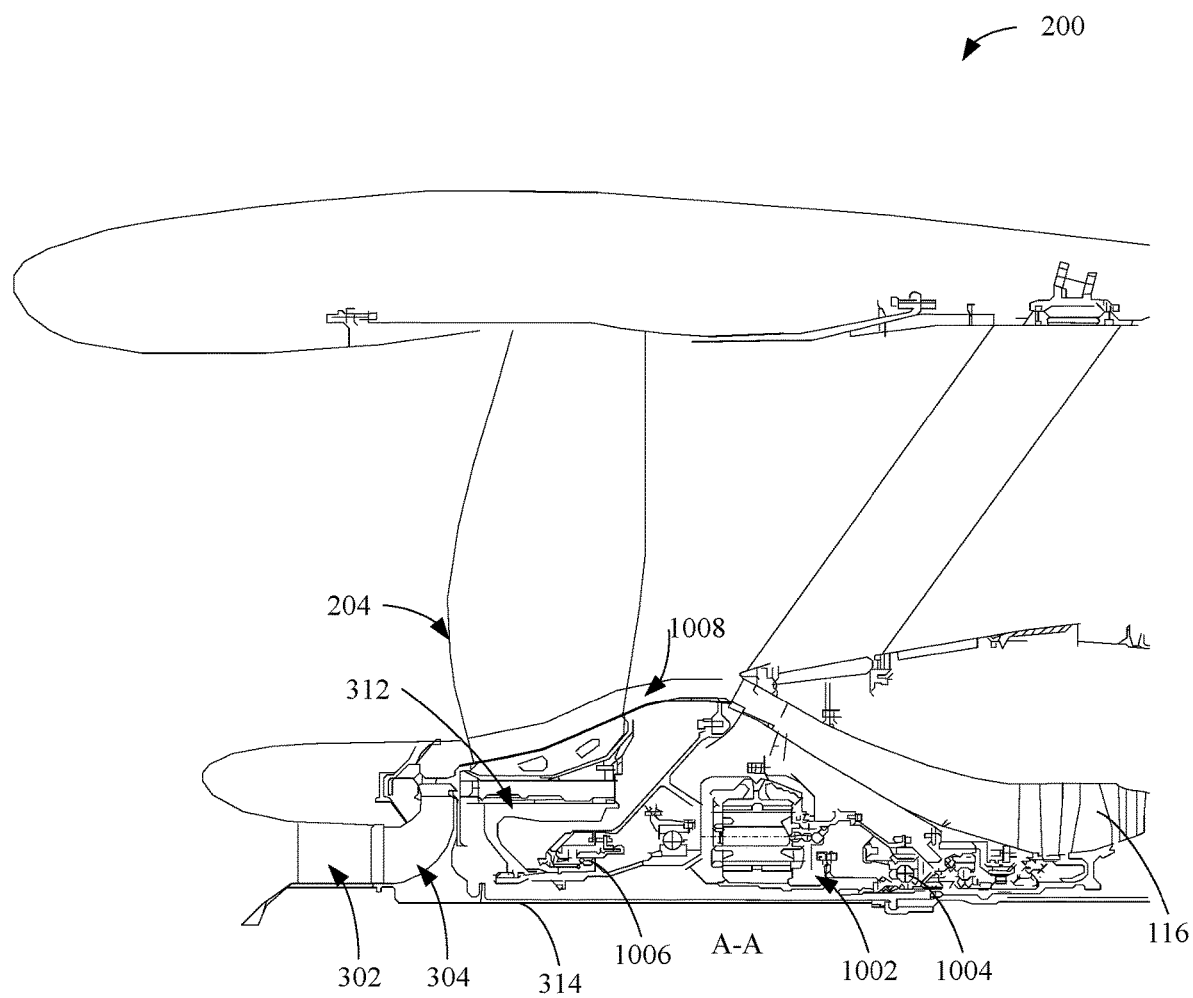
FIG. 10 is an example gear assembly to provide counter rotation to the turbofan engine of FIG. 2.

The turbofan engine 200 also includes an example low pressure spool 314 (e.g., analogous to the second (low-pressure) drive shaft 126 of FIG. 1). In the illustrated example of FIG. 3, the low pressure spool 314 is in force transmitting connection with the radial flow compressor 304. The low pressure spool 314 is also in force transmitting connection with the first rotor 312 and the blade assembly 204 via a gearbox and/or gear assembly. The gear assembly, discussed in greater detail in connection with FIG. 10, provides for counterrotation between (a) the combination of the axial compressor 302 and the first rotor 312 and (b) the radial flow compressor 304.

In the illustrated example of FIG. 3, the first portion of inlet air flow (e.g., a first portion analogous to the arrow 152 of FIG. 1) enters the turbofan engine 200 at the fore of the blade assembly 204. More particularly, the first portion of inlet airflow drives the outer airfoils 308 of the blade assembly 204. The first portion of the air flow then bypasses the remainder of the turbofan engine 200 through a bypass duct and is expelled at the aft of the turbofan engine 200 (not shown in the view of FIG. 3). The second portion of inlet air flow (e.g., a second portion analogous to the arrow 154 of FIG. 1) enters at the fore of the axial compressor 302 of the turbofan engine 200. The axial compressor 302 acts to compress the second portion of the airflow, and the second portion of the air flow then moves through the radial flow compressor 304. The radial flow compressor 304 further compresses the second portion of the air flow, and the second portion of the air flow then moves through the inner airfoils 306. The second portion of the air flow then moves to a high pressure compressor (not shown) such as the high pressure compressor 116 of FIG. 1.

In the illustrated example of FIG. 3, the splitter shroud 310 prevents the first and second portions of the air flow from mixing. Accordingly, the outer airfoils 308 act as the fan for the turbofan engine 200. Because the inner and outer airfoils 306, 308 are in force-transmitting connection, the inner airfoils 306 act to compress the second portion of the air flow and the outer airfoils 308 act to compress the first portion of the airflow when the first rotor 312 is driven (e.g., driven by a low pressure turbine such as the turbine 124).

Figure 4:
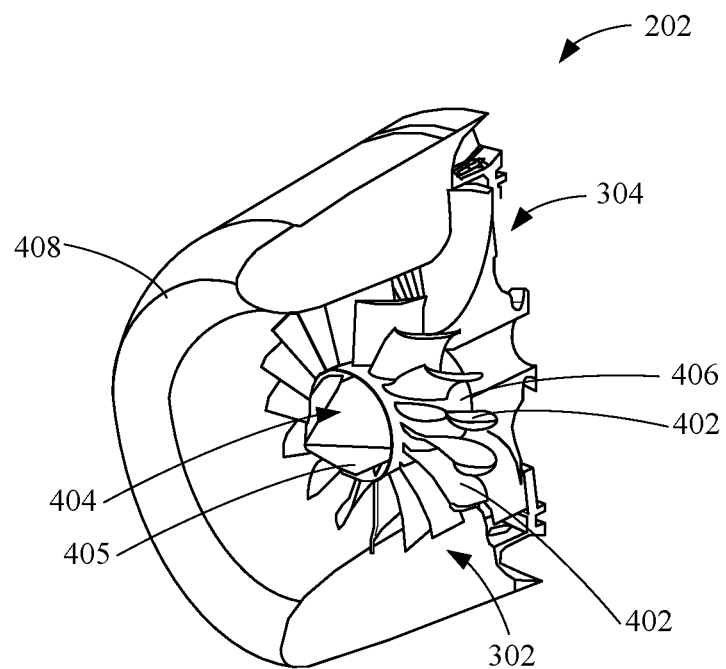
FIG. 4 is a partial perspective view of the example compact compressor of FIG. 2 showing an example axial compressor.

FIG. 4 is a partial perspective view of the example compact compressor 202 of FIG. 2 showing the example axial compressor 302 and the example radial flow compressor 304 of FIG. 3 cut along the A-A cutting line 208 of FIG. 2. In the illustrated example of FIG. 4, the blade assembly 204 and the fan casing 206 are removed. The axial compressor 302 includes example blades 402 arranged about and integral with an example annular disk 406, together forming a blisk (e.g., a bladed disk). For example, the blisk can be manufacture using subtractive manufacturing techniques such as Computer Numerical Control (CNC) milling, Electrochemical Machining (ECM), etc. The blades 402 and annular disk 406 can be mounted on an example second rotor 404. Though only a portion of the blades 402 are visible and/or labeled in the view of FIG. 4, the axial compressor 302 includes other blades 402 arranged annularly about and mounted on the second rotor 404. In the illustrated example of FIG. 4, the second rotor 404 is integral with the low pressure spool 314 (shown in FIG. 2) and includes a beveled and/or curved fore portion 405 to direct inlet air radially outward from the second rotor 404 towards the blades 402. The axial compressor 302 also includes a fore curved casing 408 about the blisk. The fore curved casing 408 acts to direct inlet air radially outward towards the outer airfoils 308 (shown in FIG. 3) or radially inward toward the blades 402 of the axial compressor 302. After blades 402 compress the air, the air moves to the radial flow compressor 304, discussed in greater detail in connection with FIG. 6. Additionally or alternatively, the axial compressor 302 can be provided with an annular array of vanes extending from the casing 408 towards the aft of the axial compressor 302 to further compress the air.

In some examples, the blades 402 have a larger chord length when compared to blades of the booster compressor 114 of the traditional turbofan 102. As used herein, a "chord length" is the distance from a leading edge of a blade to a trailing edge of the blade. For example, the blades 402 of the axial compressor 302 can have a larger chord length such that the chord to height ratio of the blade is between 2 and 6, in contrast to a standard chord to height ratio of around 1. The increased chord length enables increased fuel efficiency.

Figure 5:
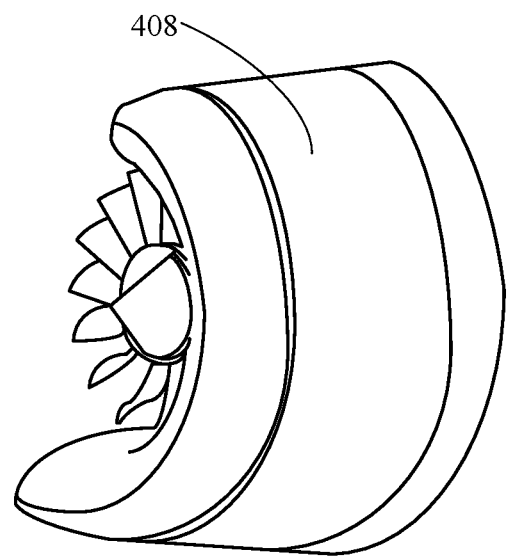
FIG. 5 is another partial perspective view of the example compact compressor of FIG. 2 showing the example axial compressor.

FIG. 5 is another partial perspective view of the example compact compressor 202 of FIG. 2 showing the example axial compressor 302 of FIG. 3 cut along the A-A cutting line 208 of FIG. 2. In FIG. 5, the fore curved casing 408 is visible.

Figure 6:
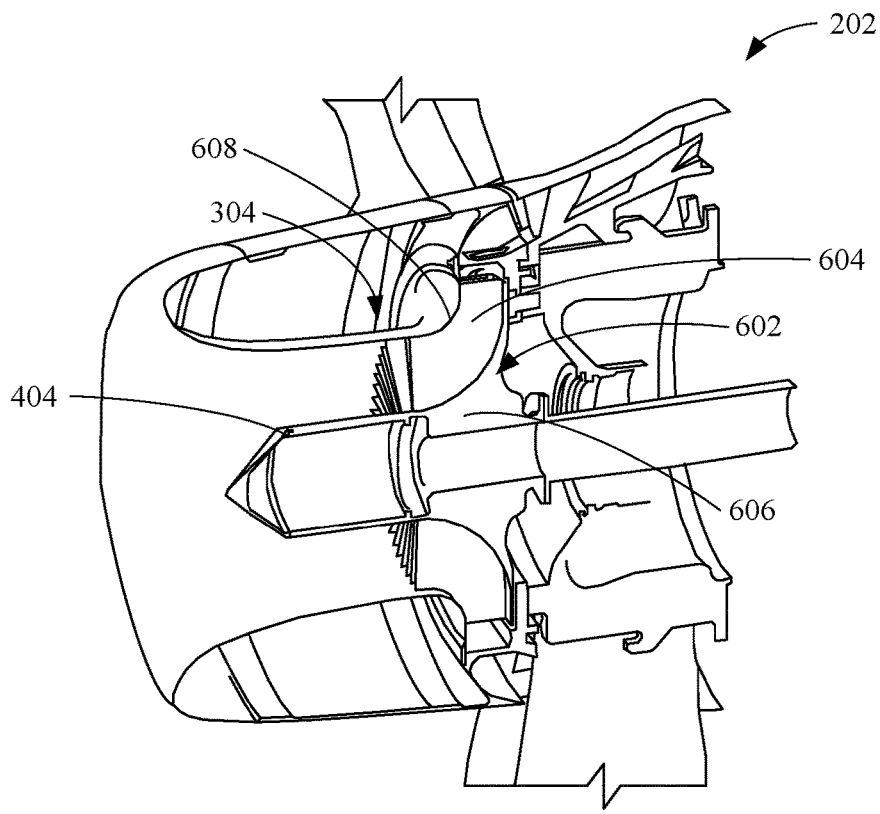
FIG. 6 is a partial perspective view of the example compact compressor of FIG. 2 showing an example radial flow compressor.

FIG. 6 is a partial perspective view of the example compact compressor 202 of FIG. 2 including the example radial flow compressor 304 of FIG. 3 cut along the A-A cutting line 208 of FIG. 2. In the illustrated example of FIG. 6, the blisk including the blades 402 and the annular disk 406 (shown in FIG. 4) is removed for visual clarity. In FIG. 6, the radial flow compressor 304 includes an example impeller 602. In FIG. 6, the impeller 602 is coupled and/or integral with the second rotor 404 of FIG. 4, which is integral with the low pressure spool 314 (shown in FIG. 2). In the example of FIG. 6, the impeller 602 includes example vanes 604 positioned between an example central portion 606 and an example curved portion 608 of the casing 408. Though only a portion of the vanes 604 are visible and/or labeled in the view of FIG. 6, the radial flow compressor 304 includes other vanes 604 annularly about and the central portion 606. Moving towards the aft of the compact compressor 202, the radius of the central portion 606 increases as does the distance between the central portion 606 and the curved portion 608 of the casing 408. Accordingly, the second portion of air is compressed and moves radially outward through the impeller 602.

Figure 7:
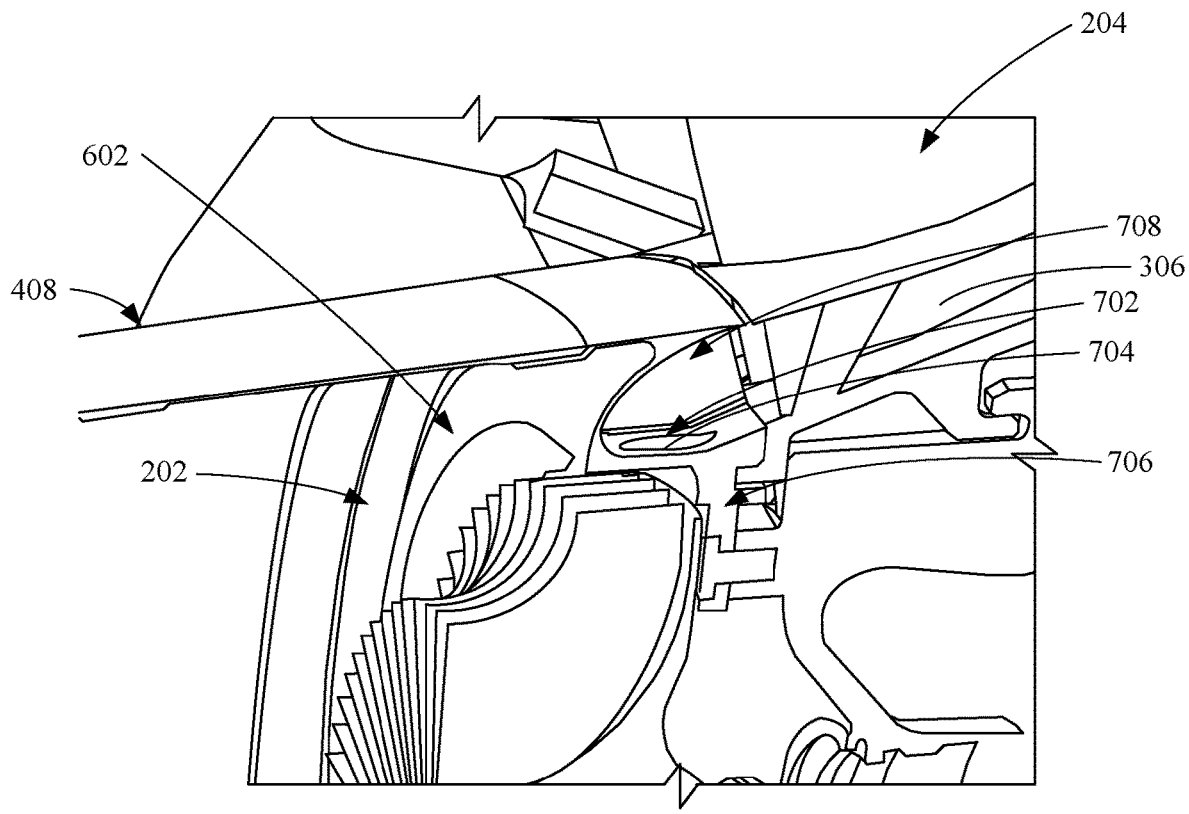
FIG. 7 is another partial perspective view of the example compact compressor of FIG. 2 showing the example radial flow compressor.

FIG. 7 is another partial perspective view of the example compact compressor 202 of FIG. 2 showing the example radial flow compressor 304 cut along the A-A cutting line 208 of FIG. 2. In FIG. 7, relative to FIG. 6, the curved portion 608 of the casing 408 is removed for visual clarity. The impeller 602 is surrounded by one or more diffusers 702. In the illustrated example of FIG. 7, the diffusers 702 are discrete passage type diffusers, including an annular array of discrete passages 704 extending through an example manifold 706. In FIG. 7, the diffusers 702 are fluidly coupled to example cavities 708 included in the manifold 706. The reduction of velocity as the air flows through the discrete passages 704 further compresses the air. The second portion of the air then flows towards the inner airfoils 306 of the counterrotating blade assembly 204 (both shown in FIG. 3) and to the high pressure compressor (not shown).

Figure 8:
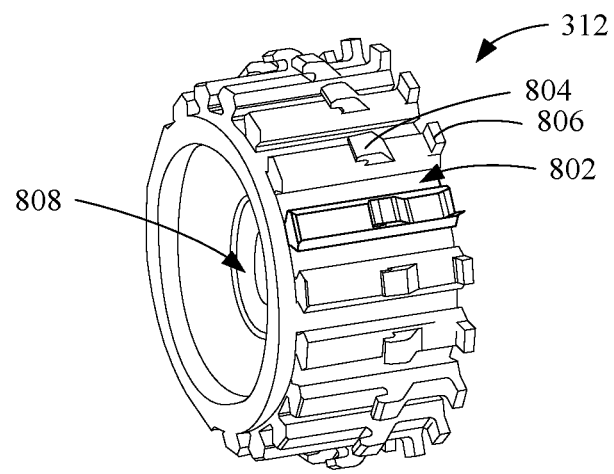
FIG. 8 is an example rotor for the example blade assembly of FIG. 2 that can be implemented in connection with the turbofan engine of FIG. 2.

FIG. 8 is the example first rotor 312 of FIG. 3 that can be implemented in connection with the turbofan engine 200 of FIG. 2. In the illustrated example of FIG. 8, the first rotor 312 is provided with axial slots 802 (e.g., dovetail slots, fir tree slots, etc.) on the first rotor 312 to mount the blade assembly 204 (shown in FIG. 2). In FIG. 8, the first rotor 312 also includes first protrusions 804 and second protrusions 806 to retain reciprocal protrusions of the blade assembly 204. One or more pins can couple the blade assembly 204 to the first rotor 312. The first rotor 312 is coupled to the low pressure spool 314 (not shown) and a turbine (e.g., a low pressure turbine) via a gear box (not shown), such that the first rotor 312 and the blade assembly 204 are counter rotating relative to the low pressure spool 314. The first rotor 312 accordingly includes a central opening 808, through which the low pressure spool 314 extends. In FIG. 8, the first rotor 312 is coaxial with the low pressure spool 314.

Figure 9:
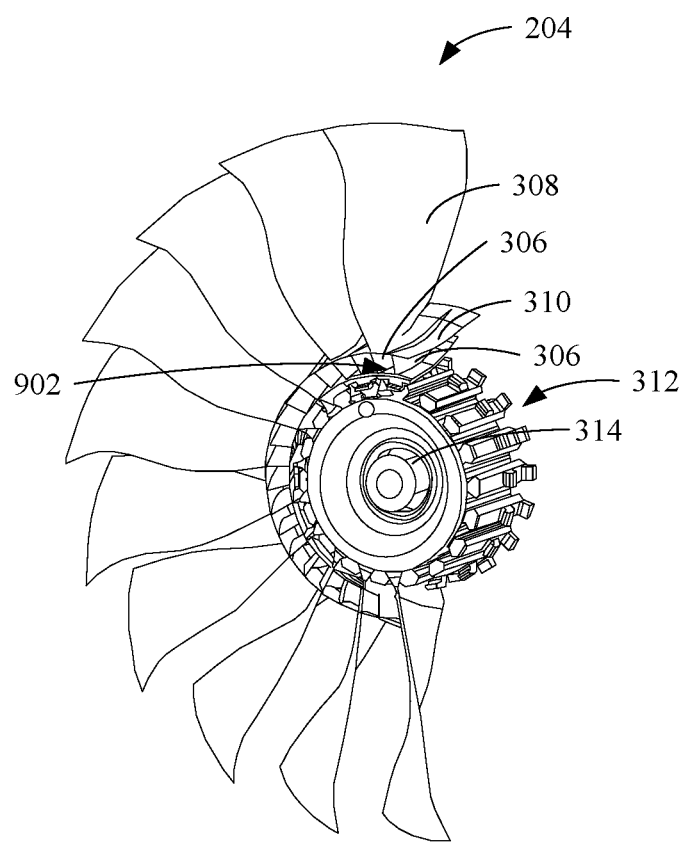
FIG. 9 is a partial perspective view of the example blade assembly of FIG. 2 mounted on the example rotor of FIG. 8 that can be implemented in connection with the turbofan engine of FIG. 2.

FIG. 9 is a partial perspective view of the example blade assembly 204 of FIG. 2 mounted on the first rotor 312 of FIG. 3 that can be implemented in connection with the turbofan engine 200 of FIG. 2 in which a portion of the blade assembly 204 removed. In the illustrated example of FIG. 9, discrete cavities 902 are defined between each two annularly adjacent inner airfoils 306, through which the second portion of the air is compressed moving through the blade assembly 204.

FIG. 10 is the turbofan engine 200 of FIG. 2 cut along the A-A cutting line 208 of FIG. 2 including an example gear assembly 1002 (e.g., a gearbox) to provide counter rotation between components. The example gear assembly 1002 provides counter rotation between the axial flow compressor 302 and radial flow compressor 304 (both of FIG. 3). The example gear assembly 1002 (also) provides counter rotation between the blade assembly 204 and the low pressure spool 314. In the illustrated example of FIG. 10, the gear assembly 1002 is configured in a star configuration including gears of various sizes (e.g., a smaller radius gear, a larger radius gear, etc.). In the example star configuration, a carrier of the gear assembly 1002 is fixed or attached to a frame rather than rotating about an engine axis. The smaller radius gear of the example gear assembly 1002 is coupled underneath the low pressure spool 314 at a first location 1004, and the larger radius gear is coupled at a second location 1006 to the first rotor 312. For example, the gear assembly 1002 can drive (a) the axial flow compressor 302 and the blade assembly 204 in a counterclockwise and/or positive direction and can drive (b) the low pressure spool 314, the second rotor 404, and the radial flow compressor 304 in a clockwise and/or negative direction. The axial flow compressor 302 and the blade assembly 204 are both on a first shaft (e.g., the low pressure spool 314) and rotate in a same first direction. The radial flow compressor 304 is on a second rotor (e.g., the second rotor 404, which is integral with the low pressure spool 314) and rotates in a second direction. The clockwise and counterclockwise rotations can occur at different speeds via the different sized gears of the gear assembly 1002.

For example, air enters the engine in the axial flow compressor 302, travels to the radial flow compressor 304, moves along a hub flow path 1008, and flows toward the high pressure compressor 116. The example gearbox (e.g., star gearbox) 1002 enables low speed rotation in one direction (e.g., clockwise) and the high speed rotation in the opposite direction (e.g., counterclockwise), wherein the speed (e.g., a ratio of low speed to high speed) achieved is based on the gear ratio between the first rotor 312 and the shaft 314 (e.g., the low pressure spool 314) (e.g., the radius of gears in the gearbox 1002 defines the ratio of low speed to high speed between the first rotor 312 and the shaft 314, etc.). Thus, for example, the gearbox 1002 can be used to drive the axial flow compressor 302 at a first speed in a first direction while driving the radial flow compressor 304 in a second, opposite direction at a second speed higher than the first speed. As such, the axial flow compressor 302 and the radial flow compressor 304 can be arranged in serial flow and positioned in place of a traditional nose cone (e.g., spinner cone) of the turbofan engine 200.

From the foregoing, it will be appreciated that example methods, apparatus and articles of manufacture have been disclosed that decrease the material and increase efficiency of a turbofan engine by placing an axial flow compressor and radial flow compressor (e.g., collectively, a compact compressor) in the space traditionally dedicated to the spinner cone.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Further aspects of the invention are provided by the subject matter of the following clauses:

1. A gas turbine engine apparatus defining an axial direction and a radial direction, the gas turbine engine comprising an axial flow compressor, a radial flow compressor, wherein the axial flow compressor is located axially forward of the radial flow compressor, and a blade assembly including a splitter shroud to divide incoming air into axial air flow for the axial flow compressor and radial air flow for the radial flow compressor, the blade assembly rotating relative to the axial flow compressor and counter-rotating relative to the radial flow compressor, and wherein the blade assembly is located axially aft of the radial flow compressor.

2. An apparatus of any of the preceding clauses wherein outer airfoils of the blade assembly define a fan disposed in a bypass flow passage of the gas turbine engine, and wherein inner airfoils of the blade assembly are disposed within a primary flow passage of the gas turbine engine common to the inner airfoils, the axial flow compressor, and the radial flow compressor.

3. An apparatus of any of the preceding clauses wherein the radial flow compressor is a centrifugal compressor including an impeller and at least one diffuser passage.

4. An apparatus of any of the preceding clauses wherein the impeller includes a solid central portion increasing in radial diameter in the axial direction towards an aft portion of the gas turbine engine.

5. An apparatus of any of the preceding clauses wherein the gas turbine engine is a turbofan.

6. An apparatus of any of the preceding clauses wherein the radial flow compressor is a mixed-flow compressor.

7. An apparatus of any of the preceding clauses further including a gearbox located axially aft of the blade assembly to provide for the counter-rotation between (a) the blade assembly and the axial flow compressor and (b) the radial flow compressor.

8. An apparatus of any of the preceding clauses further including a gearbox located axially aft of the blade assembly to provide for the counter-rotation between the axial flow compressor and the radial flow compressor.

9. A turbofan engine apparatus defining an axial direction, comprising an axial compressor including a casing and a plurality of airfoils, a centrifugal compressor including an impeller and a plurality of diffuser passages, the centrifugal compressor to the axial aft of the axial compressor, and a fan disposed axially aft of the centrifugal compressor.

10. An apparatus of any of the preceding clauses wherein a ratio of chord length to height of the plurality of airfoils is between 2 and 6.

11. An apparatus of any of the preceding clauses wherein at least one of (a) the axial compressor or (b) the centrifugal compressor is manufactured using a subtractive manufacturing process.

12. An apparatus of any of the preceding clauses wherein the axial compressor and the centrifugal compressor at least partially define a booster compressor, and further including a high-pressure compressor disposed axially aft of the fan.

13. An apparatus of any of the preceding clauses wherein the fan partially defines a blade assembly including a splitter shroud to divide incoming air into axial air flow for the axial flow compressor and radial air flow for the centrifugal flow compressor, the fan disposed in a bypass flow passage.

14. An apparatus of any of the preceding clauses wherein the blade assembly further includes inner airfoils, the inner airfoils disposed in a common flow passage with an axial and a centrifugal compressor stages.

15. An apparatus of any of the preceding clauses wherein the axial and centrifugal compressors are coupled to a low-pressure turbine via a low-pressure shaft.

16. A compressor assembly apparatus for an aircraft engine, the aircraft engine defining an axial direction and a radial direction, comprising an axial flow compressor, a radial flow compressor to the axial aft of the axial flow compressor, and a blade assembly including inner airfoils and outer airfoils separated by a splitter shroud to divide incoming air into axial air flow for the axial flow compressor and radial air flow for the radial flow compressor and disposed axially aft of the radial flow compressor, wherein the axial flow compressor, the radial flow compressor, and the inner airfoils define a flow passage.

17. An apparatus of any of the preceding clauses wherein the radial flow compressor is a mixed-flow compressor, further including a plurality of diffuser passages.

18. An apparatus of any of the preceding clauses wherein the radial flow compressor is a centrifugal compressor, further including a plurality of diffuser passages.

19. An apparatus of any of the preceding clauses wherein the blade assembly is mounted to a central rotor.

20. An apparatus of any of the preceding clauses wherein the blade assembly is counter-rotating relative to the radial flow compressor.

21. An apparatus of any of the preceding clauses wherein at least one of (a) the axial flow compressor or (b) the radial flow compressor includes one or more milled components.

22. A gas turbine engine apparatus defining an axial direction and a radial direction, the gas turbine engine comprising, a radial flow compressor, wherein the radial flow compressor is located in the nose cone, and a blade assembly including a splitter shroud to divide incoming air into axial air flow for the axial flow compressor and radial air flow for the radial flow compressor, the blade assembly counter-rotating relative to the radial flow compressor, and wherein the blade assembly is located axially aft of the radial flow compressor.

23. An apparatus of any of the preceding clauses, wherein outer airfoils of the blade assembly define a fan disposed in a bypass flow passage of the gas turbine engine, and wherein inner airfoils of the blade assembly are disposed within a primary flow passage of the gas turbine engine common to the inner airfoils and the radial flow compressor.

24. An apparatus of any of the preceding clauses, wherein the radial flow compressor is a centrifugal compressor including an impeller and at least one diffuser passage.

25. An apparatus of any of the preceding clauses, wherein the impeller includes a solid central portion increasing in radial diameter in the axial direction towards an aft portion of the gas turbine engine.

26. An apparatus of any of the preceding clauses, wherein the gas turbine engine is a turbofan.

27. An apparatus of any of the preceding clauses, wherein the radial flow compressor is a mixed-flow compressor.

28. An apparatus of any of the preceding clauses, further including a gearbox located axially aft of the blade assembly to provide for the counter-rotation between (a) the blade assembly and (b) the radial flow compressor.

29. A turbofan engine apparatus defining an axial direction, comprising an axial compressor including a casing and a plurality of airfoils, a centrifugal compressor including an impeller and a plurality of diffuser passages, the centrifugal compressor to the axial aft of the axial compressor, and a fan disposed axially aft of the centrifugal compressor.

30. An apparatus of any of the preceding clauses, wherein a ratio of chord length to height of the plurality of airfoils is between example 2 and 6.

31. An apparatus of any of the preceding clauses, wherein the centrifugal compressor is manufactured using a subtractive manufacturing process.

32. An apparatus of any of the preceding clauses, wherein the centrifugal compressor at least partially define a booster compressor, and further including a high-pressure compressor disposed axially aft of the fan.

33. An apparatus of any of the preceding clauses, wherein the fan partially defines a blade assembly including a splitter shroud to divide incoming air into axial air flow for the axial flow compressor and radial air flow for the centrifugal flow compressor, the fan disposed in a bypass flow passage.

34. An apparatus of any of the preceding clauses, wherein the blade assembly further includes inner airfoils, the inner airfoils disposed in a common flow passage with a centrifugal compressor stage.

35. An apparatus of any of the preceding clauses, wherein the centrifugal compressor is coupled to a low-pressure turbine via a low-pressure shaft.

36. A compressor assembly apparatus for an aircraft engine, the aircraft engine defining an axial direction and a radial direction, comprising a radial flow compressor and a blade assembly including inner airfoils and outer airfoils separated by a splitter shroud to divide incoming air into axial air flow for the axial flow compressor and radial air flow for the radial flow compressor and disposed axially aft of the radial flow compressor, wherein the radial flow compressor, and the inner airfoils define a flow passage.

37. An apparatus of any of the preceding clauses, wherein the radial flow compressor is a mixed-flow compressor, further including a plurality of diffuser passages.

38. An apparatus of any of the preceding clauses, wherein the radial flow compressor is a centrifugal compressor, further including a plurality of diffuser passages.

39. An apparatus of any of the preceding clauses, wherein the blade assembly is mounted to a central rotor.

40. An apparatus of any of the preceding clauses, wherein the blade assembly is counter-rotating relative to the radial flow compressor.

41. An apparatus of any of the preceding clauses, wherein the radial flow compressor includes one or more milled components.

The following claims are hereby incorporated into this Detailed Description by this reference, with each claim standing on its own as a separate embodiment of the present disclosure.

What is claimed is:

1. A gas turbine engine defining an axial direction and a radial direction, the gas turbine engine comprising:
   a first rotor coupled to a shaft, the shaft to rotate in a first direction;
   a second rotor rotatably coupled to the shaft via a gear assembly, the second rotor to rotate in a second direction;
   an axial flow compressor;
   a radial flow compressor including an impeller coupled to the first rotor, the axial flow compressor located axially forward of the radial flow compressor, wherein the axial flow compressor and the radial flow compressor at least partially define a low pressure compressor;
   a blade assembly including a splitter shroud to provide a divide between a first airflow and a second airflow, the blade assembly coupled to the second rotor, the blade assembly to counter-rotate relative to the radial flow compressor, wherein the blade assembly is located axially aft of the radial flow compressor; and
   a high pressure compressor located axially aft of the blade assembly.

2. The gas turbine engine of claim 1, wherein outer airfoils of the blade assembly define a fan disposed in a bypass flow passage of the gas turbine engine, and wherein inner airfoils of the blade assembly are disposed within a primary flow passage of the gas turbine engine common to the inner airfoils, the axial flow compressor, and the radial flow compressor.

3. The gas turbine engine of claim 2, wherein the bypass flow passage defines a first flowpath for the first airflow and the primary flow passage defines a second flowpath for the second airflow, the splitter shroud to prevent mixing of the first airflow and the second airflow.

4. The gas turbine engine of claim 1, wherein the radial flow compressor is a centrifugal compressor including the impeller and at least one diffuser passage.

5. The gas turbine engine of claim 4, wherein the impeller includes a solid central portion increasing in radial diameter in the axial direction towards an aft portion of the gas turbine engine.

6. The gas turbine engine of claim 1, wherein the radial flow compressor is a mixed-flow compressor.

7. The gas turbine engine of claim 1, wherein the axial compressor includes a casing and a plurality of airfoils.

8. The gas turbine engine of claim 7, wherein the gear assembly is to provide for counter-rotation between (a) the blade assembly and (b) the radial flow compressor.

9. A turbofan engine defining an axial direction, comprising:
   a shaft to rotate in a first direction;
   a rotor driven by the shaft via a gear box, the rotor to rotate in a second direction opposite the first direction;
   an axial compressor including a casing and a plurality of airfoils;
   a centrifugal compressor including an impeller and a plurality of diffuser passages, the centrifugal compressor positioned to the axial aft of the axial compressor, the axial compressor and the centrifugal compressor to at least partially define a low pressure compressor;
   a fan disposed axially aft of the centrifugal compressor, the fan coupled to the rotor; and
   a high-pressure compressor disposed axially aft of the fan.

10. The turbofan engine of claim 9, wherein a ratio of a chord to height length of each of the airfoils is between 2 and 6.

11. The turbofan engine of claim 9, wherein the fan partially defines a blade assembly, the blade assembly including a splitter shroud to divide (a) a first flow of air corresponding to outer airfoils of a bypass flow passage and (b) a second flow of air from the centrifugal compressor, the outer air foils defining the fan, the fan disposed in the bypass flow passage.

12. The turbofan engine of claim 11, wherein the blade assembly includes inner airfoils, the inner airfoils disposed in a common flow passage with the axial and the centrifugal compressor stages, the common flow passage corresponding to the second flow of air.

13. The turbofan engine of claim 9, wherein the shaft is a low-pressure shaft, and wherein the fan and the centrifugal compressor are operatively coupled to a low-pressure turbine via the low-pressure shaft.

14. The turbofan engine of claim 13, wherein the impeller of the centrifugal compressor is integral with the low-pressure shaft.

15. A compressor assembly for an aircraft engine, the aircraft engine defining an axial direction and a radial direction, comprising:
- a rotor driven by a shaft via a gear assembly, the rotor to rotate in a first direction opposite a second direction of rotation of the shaft;
- an axial flow compressor;
- a radial flow compressor to the axial aft of the axial flow compressor, the axial flow compressor and the radial flow compressor to define a low pressure compressor;
- a blade assembly coupled to the rotor, the blade assembly including inner airfoils and outer airfoils separated by a splitter shroud, the blade assembly disposed axially aft of the radial flow compressor, wherein the axial flow compressor, the radial flow compressor, and the inner airfoils define a first flow passage; and
- a high pressure compressor positioned aft of the blade assembly, the high pressure compressor in fluid communication with the first flow passage.

16. The compressor assembly for the aircraft engine of claim 15, wherein the radial flow compressor is a centrifugal compressor, further including a plurality of diffuser passages.

17. The compressor assembly for the aircraft engine of claim 15, wherein the shaft is a low-pressure shaft powered by a low-pressure turbine, and wherein the blade assembly is in force transmitting connection with the low-pressure turbine.

18. The compressor assembly for the aircraft engine of claim 15, wherein the rotor is a first rotor, and wherein the radial flow compressor is coupled to the shaft via a second rotor.

19. The compressor assembly for the aircraft engine of claim 18, wherein the blade assembly counter-rotates relative to the radial flow compressor via the gear assembly.

20. The compressor assembly for the aircraft engine of claim 15, wherein the outer airfoils are disposed in a second flow passage, the splitter shroud to divide the first flow passage and the second flow passage.

* * * * *